United States Patent [19]
Burkhardt

[11] Patent Number: 4,512,082
[45] Date of Patent: Apr. 23, 1985

[54] ERROR CORRECTION ARRANGEMENT FOR DIGITAL LENGTH OR ANGLE MEASURING DEVICE

[75] Inventor: Horst Burkhardt, Truchtlaching, Fed. Rep. of Germany

[73] Assignee: Dr. Johannes Heidenhain GmbH, Traunreut, Fed. Rep. of Germany

[21] Appl. No.: 473,586

[22] Filed: Mar. 9, 1983

[30] Foreign Application Priority Data

Mar. 10, 1982 [DE] Fed. Rep. of Germany ....... 3208591

[51] Int. Cl.³ ............................................. G01B 11/04
[52] U.S. Cl. ................................. 33/125 R; 33/125 C
[58] Field of Search ............ 33/125 C, 125 A, 125 T, 33/125 R; 356/373, 374; 250/237 G

[56] References Cited

U.S. PATENT DOCUMENTS

| | | | |
|---|---|---|---|
| 3,775,655 | 11/1973 | Du Vall | 33/125 T |
| 4,170,829 | 10/1979 | Nelle | 33/125 C |
| 4,262,423 | 4/1981 | Affa | 33/125 A |

Primary Examiner—William D. Martin, Jr.
Attorney, Agent, or Firm—Willian Brinks Olds Hofer Gilson & Lione Ltd.

[57] ABSTRACT

A length measuring system of the type having a division on a scale which is scanned by a scanning unit in order to measure the relative position of a slide with respect to a bed of a machine is disclosed. In order to correct division errors and/or machine errors between a follower fastened to the slide and the scanning unit, there is arranged an electromechanical adjusting element between the follower and the slide. In a first preferred embodiment, this adjusting element takes the form of a piezoelectric element, which, in accordance with electric correction signals applied thereto, varies in length and thereby corrects the relative position of the scanning unit and the follower in accordance with the desired error correction course. Alternate embodiments employ magnetostrictive cores and electromagnetic coil arrangements to accomplish the desired error correction.

19 Claims, 11 Drawing Figures

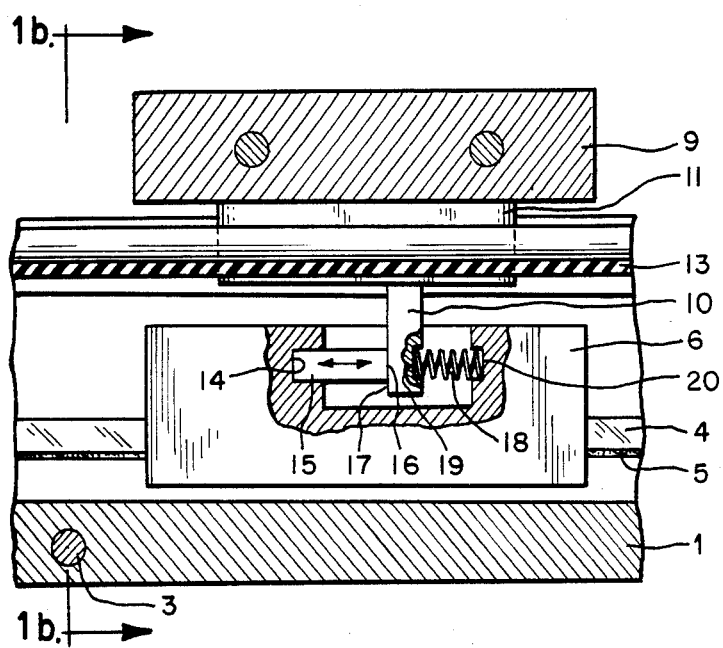
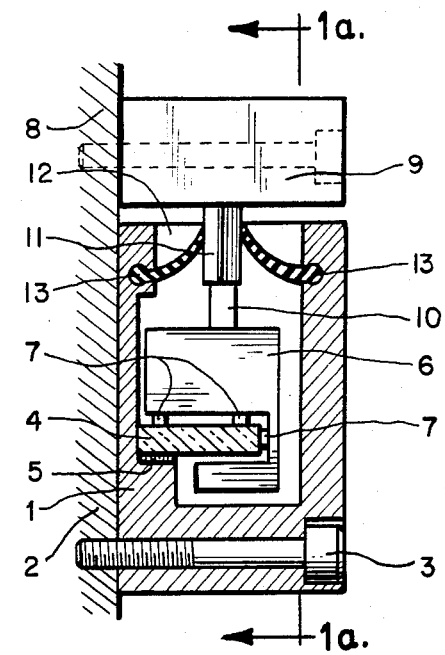
FIG.1a. FIG.1b.
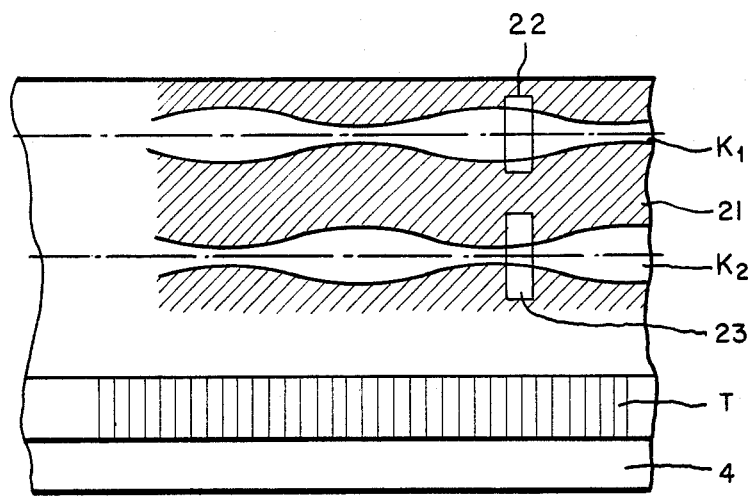
FIG. 2
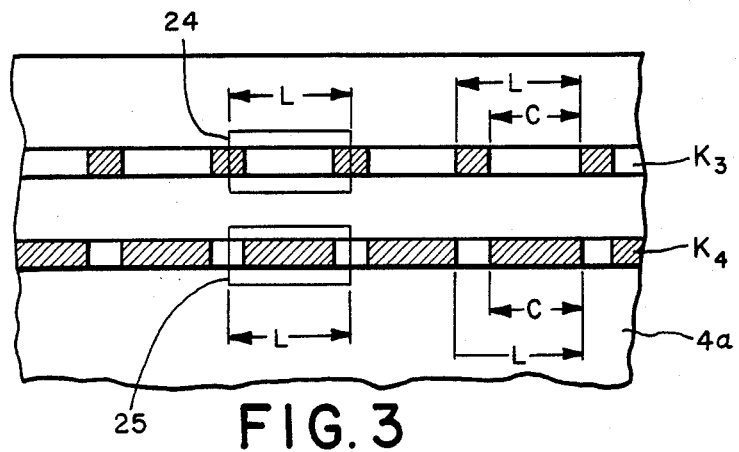
FIG. 3

ERROR CORRECTION ARRANGEMENT FOR DIGITAL LENGTH OR ANGLE MEASURING DEVICE

BACKGROUND OF THE INVENTION

This invention relates to an error correction arrangement for a digital, electric, length or angle measuring system of the type which includes a measuring division and a scanning unit, in which the measuring division is coupled to a first object and the scanning unit is coupled to a second object moveable relative to the first.

A variety of arrangements for error corrections are known to the art for use in position measuring systems. For example, in German Pat. No. 853 657 there is described an optical measuring system in which a plate is electrically moveable in the beam path in correspondence to the error being corrected.

German Pat. No. 27 24 858 discloses a length measuring system which incorporates a correction system including a link chain, the links of which are adjustable according to the error to be corrected transversely to the measuring direction. A transfer element is provided which scans the link chain and brings about a correcting movement between the scanning unit and the scale of the measuring system. The accuracy of this error correction system is dependent in part upon the length of individual links in the link chain, that is on the number of links per measuring length unit.

German Pat. No. 28 20 753 discloses an arrangement for error correction in a length measuring system in which an error correction profile is integrally formed with a housing which carries a scale. This profile is scanned by transfer element which brings about a correcting movement between a scanning unit and the scale included in the measuring system.

The aforementioned correction arrangements employing transfer elements in the form of swingable angle levers are subject to mechanical wear. Furthermore, such mechanical correction arrangements bring about substantially increased cross-sectional dimensions of the position measuring system in many cases. Such an increase in the size of the position measuring system can be detrimental in many applications, and can restrict the flexibility of use of the measuring system.

SUMMARY OF THE INVENTION

The present invention is directed to an improved arrangement for providing error correction in a digital, electric, position measuring system. In particular, this invention is directed to such an improved error correction system which substantially reduces the need for mechanical elements and which can be directly installed in commercially utilized measuring systems without substantial modifications to the structure of these systems.

According to this invention, a digital length or angle measuring system of the type described above is provided with at least one electrical or electro-mechanical adjusting element responsive to an electrical correction signal. This electrical or electro-mechanical adjusting element brings about a corrective movement between a scanning unit and a follower or between components of a scanning unit in order to shift the scanning unit or a portion thereof with respect to the follower to eliminate or reduce measurement errors. The present invention provides the important advantage that, particularly in the preferred embodiments disclosed below, no expensive mechanical elements are required for the error correction system. In this way, a simple and economical construction for a position measuring system is provided. Because the preferred embodiments of this invention are characterized almost by an absence of parts subject to wear, and because of the very low spatial requirements of the error correction system of this invention, both reliable operation and flexibility of use are insured. The present invention allows for the correction of linear as well as nonlinear errors and is applicable in many cases regardless of the measuring length. Further advantageous features of the invention are set forth in the attached dependent claims.

The invention itself, together with further objects and attendant advantages, will best be understood by reference to the following detailed description taken in conjunction with the accompanying drawings.

BRIEF DESCRIPTION OF THE DRAWINGS

FIGS. 1a and 1b are a longitudinal sectional view and a cross-sectional view, respectively, of a length measuring system which incorporates a first preferred embodiment of this invention.

FIG. 2 is a fragmentary plan view of a measuring scale suitable for use with this invention.

FIG. 3 is a fragmentary plan view of a second measuring scale suitable for use with this invention.

DETAILED DESCRIPTION OF THE PRESENTLY PREFERRED EMBODIMENTS

Figure 4:
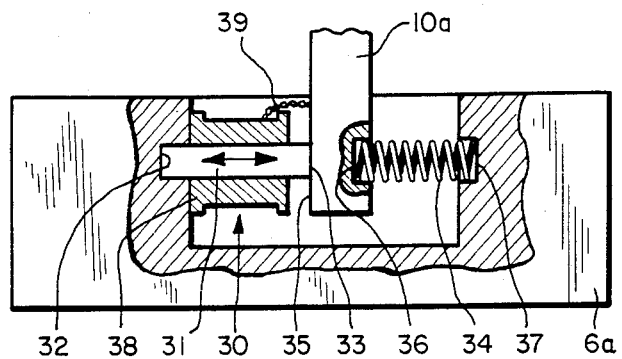
FIG. 4 is a fragmentary, cut away view of portions of a length measuring system which incorporate a second preferred embodiment of this invention.

Turning now to the drawings, FIGS. 1a and 1b are longitudinal sectional views and cross-sectional views, respectively of a length measuring system which incorporates a first preferred embodiment of this invention. This system includes a housing 1 which takes the form of a hollow profile and is fastened to a bed 2 of a processing machine (not shown) by means of a screw connection 3. The housing 1 defines an interior surface which serves to support a measuring scale 4 by means of an adhesive layer 5. The scale 4 defines two guide surfaces which are oriented perpendicularly to one another. A scanning unit 6 is guided along these two guide surfaces by means of rollers 7. This scanning unit 6 includes means (not shown) in the form of an illuminating device, a scanning plate, and a plurality of photo sensors, for scanning the division T of the scale 4. The processing machine also includes a slide piece 8 to which is mounted in an arbitrary manner a mounting foot 9. This mounting foot 9 defines a follower 10 which includes a sword shaped, tapered section 11 positioned to extend through a slit 12 formed in the otherwise completely enclosed housing 1. In this embodiment, elastic sealing lips 13 are arranged in the slit 12 around the tapered section 11 in order to prevent the penetration of dirt or foreign matter into the interior of the housing 1. Relative movement of the slide piece 8 with respect to the bed 2 is transferred by the follower 10 to the scanning unit 6. The scanning unit 6 operates to generate electric, periodic, analog measuring signals as it scans the division T of the scale 4. These measuring signals are supplied to an evaluating unit (not shown) which evaluates these signals to determine the relative position of the slide piece 8 with respect to the bed 2.

For the correction of division errors or machine errors in accordance with this invention, a recess 14 is provided in the scanning unit 6. An electro-mechanical adjusting element which in this embodiment takes the form of a piezoelectric element 15 is fastened in the recess 14. A surface 16 of the piezoelectric element 15 is maintained in constant contact with a surface 17 of the follower 10 by means of a pressure spring 18. This pressure spring 18 is supported by and extends between a depression 19 formed in the follower 10 and in a depression 20 formed in the scanning unit 6.

The piezoelectic element 15 is acted upon by electric correction signals conducted by electrical wires (not shown). These correction signals vary in correspondence with the desired error correction, and they cause the piezoelectric element 15 to alter its length in order to bring about the desired correction of the relative position of the scanning unit 6 with respect to the follower 10.

These electric correction signals are obtained in this preferred embodiment from two correction tracks $K_1$ and $K_2$ which are situated adjacent to and alongside of the division T on the transparent scale 4, as shown in FIG. 2. In FIG. 2, the correction tracks $K_1$ and $K_2$ are transparent regions in an otherwise opaque layer 21. The widths of these correction tracks $K_1$ and $K_2$ are modulated in order to record correction information in accordance with the desired error correction. These error correction tracks $K_1$ and $K_2$ are scanned by means of photosensors 22, 23 included in the scanning unit 6. These photosensors 22, 23 operate to measure the light transmitted through the correction tracks $K_1$ and $K_2$. The output signals of these photosensors 22, 23 are amplified appropriately and then applied to the piezoelectric element 15 as correction signals. These correction signals bring about length dilations and length contractions, respectively, of the piezoelectric element 15 in the measuring direction in order to correct the relative position of the scanning unit 6 with respect to the follower 10 in the measuring direction in accordance with the desired error correction. The correction tracks $K_1$ and $K_2$ are in this preferred embodiment constructed as push pull ("Gegentakt") tracks, since the correction signals can have both positive and negative algebraic signs.

FIG. 3 shows an alternate embodiment of a scale suitable for use with this invention. In FIG. 3, a transparent scale 4a is provided with two correction tracks $K_3$, $K_4$ oriented alongside of a division (not shown). These correction tracks $K_3$, $K_4$ act to optically record correction information according to the desired error course. The correction tracks $K_3$, $K_4$ are positioned to be scanned by two photoelectric elements 24, 25 in a scanning unit (not shown). These photoelectric elements 24, 25 are circuited in push/pull, and they or the corresponding scanning fields have a length L in the measuring direction. The correction tracks $K_3$, $K_4$ in a similar manner have a period length L in the measuring direction, in which each period consists of a transparent field and of an opaque field. In the correction track $K_4$, the nontransparent (shaded) field has length C and the transparent field has length L-C. In the correction track $K_3$, the transparent field has length C and the nontransparent (shaded or cross-hatched) field has length L-C. The photosensors 24, 25, when switched in difference, generate in the scanning of the correction tracks $K_3$, $K_4$ the output signal $U = U_O(2C-L)$. Thus, the output signal U depends on the scanning ratio C/L and at a constant scanning ratio C/L is independent of the movement of the photoelements 24, 25 along the correction tracks $K_3$, $K_4$. In a similar manner to that described above, this output signal U can be suitably amplified and then applied as a correction signal to an electro-mechanical adjusting element for the correction of the relative position between a scanning unit and a follower to bring about the desired error correction.

FIG. 4 shows a fragmentary cutaway view of a portion of a length measuring system which incorporates a magnetostrictive element 30 which acts as an adjusting element to adjust the separation between a scanning unit 6a and a follower 10a. In this preferred embodiment, the magnetostrictive element 30 includes a cylindrical bolt 31 of magnetostrictive material which is secured in a recess 32 defined in the scanning unit 6a. A surface 33 of this bolt 31 is held in constant contact with a surface 35 of the follower 10a by means of a pressure spring 34. The pressure spring 34 is supported in a depression 36 of the follower 10a and in a depression 37 of a scanning unit 6a. The magnetostrictive bolt 31 is surrounded by an electric coil 38 which is fastened to the scanning unit 6a. Correction signals are applied to the electric coil 38 by means of electric conductors 39, so that the bolt 31 is made to increase and decrease in length along the measuring direction as desired for correction of the relative position between the scanning unit 6a and the follower 10a to bring about the desired error correction.

Figure 5:
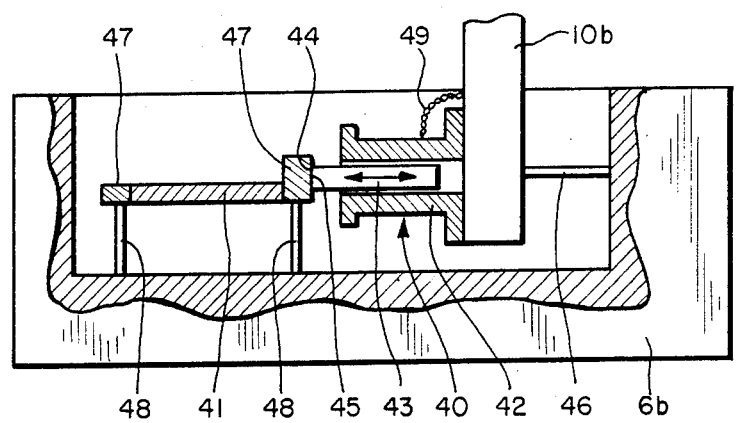
FIG. 5 is a fragmentary, cut away view of portions of a length measuring system which incorporate a third preferred embodiment of this invention.

FIG. 5 shows a fragmentary cutaway view of a length measuring system which includes an electromagnetic element 40 which operates as an adjusting element to adjust the separation between a scanning plate 41 of a scanning unit 6b and a follower 10b. In this embodiment, the electro-magnetic element 40 includes an electric coil 42 fastened to the follower 10b and a longitudinally shiftable core 43 disposed in the interior of the coil 42. The end surface 44 of the core 43 extends away from the coil, and is held in constant contact with a surface 45 of a carrier 47 for the scanning plate 41 by means of two leaf springs 48 coupled between the carrier 47 and the scanning unit 6b. The follower 10b is articulately connected to the scanning unit 6b by means of a wire 46 which is rigid in the measuring direction. Correction signals applied to the coil 42 by means of electrical conductors 49 bring about corresponding position changes of the core 43 with respect to the coil 42 in order to correct the relative position between the scanning plate 41 and the follower 10b in accordance with the desired error course. In this preferred embodiment, the scanning plate 41 is slideable in the scanning unit 6b in a direction parallel to the scale as guided by the leaf springs 48. This arrangement is recommended only when small corrections are required. The conductors 49 run inside the interior of the hollow follower 10b.

Figure 10:
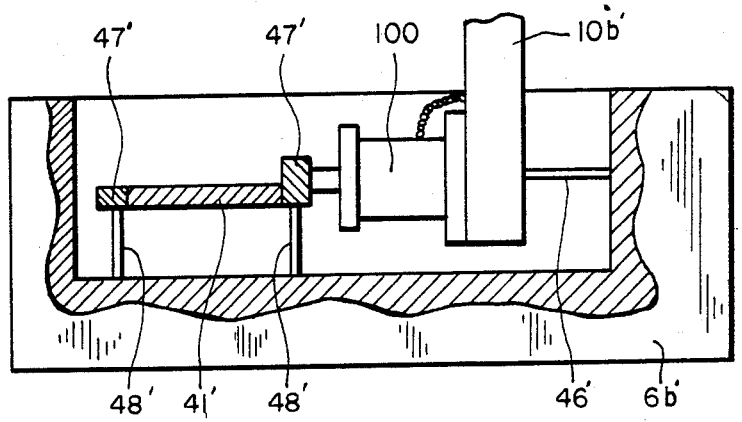
FIG. 10 is a schematic representation of portions of a length measuring instrument which incorporate a seventh preferred embodiment of the present invention.

As shown in FIG. 10, an adjusting element between a scanning unit or a scanning plate and a follower can also be formed by a linear motor or by an electric motor. In FIG. 10, many elements are similar to those of FIG. 5, and corresponding reference numbers have been used. As shown in FIG. 10, an electric motor 100 is used which acts on a spindle 102 in order to correct the relative position between the scanning plate 41' and the follower 10b' according to the desired error correction course. In alternative embodiments, the motor 100 can act on an eccentric or a gear track to correct the relative position between the scanning unit or the scanning plate and the follower as desired.

Figure 6:
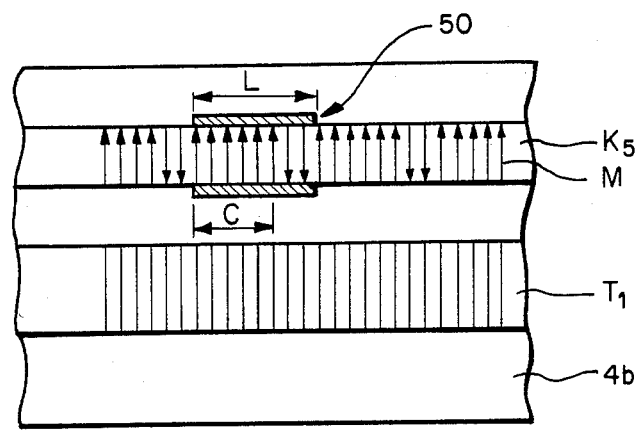
FIG. 6 is a fragmentary plan view of yet another measuring scale suitable for use with this invention.

In FIG. 6, a scale 4b suitable for use in this invention is shown which incorporates a magnetizeable correction track $K_5$ alongside a division $T_1$. This correction track $K_5$ operates to record correction information magnetically, according to a desired error course. The correction track $K_5$ is scanned by a Hall element 50 included in a scanning unit (not shown). This correction track $K_5$ is magnetized with a period length L according to a certain pattern made up of regions magnetized positively up to saturation and regions magnetized negatively up to saturation. The arrows in the correction track $K_5$ of FIG. 6 represent the magnetization vectors M of the correction track $K_5$ schematically. Since the Hall element 50 also is characterized by length L in the measuring direction, the output of the Hall element 50 is a Hall voltage $U_H = B_O C - B_O(L-C) = B_O(2C-L)$, in correspondence to the mean or average value of the two magnetic inductions $\pm B_O$ within a period. Because of the correspondence between the length L of the Hall element 50 and the periodicity L of the magnetization vectors M, the Hall voltage $U_H$ generated by the Hall element 50 does not change when the Hall element 50 is moved and the scanning ratio C/L is kept constant. A change in the scanning ratio C/L within the period L brings about a change in the Hall voltage $U_H$. This Hall voltage $U_H$ can likewise be amplified and applied in a manner similar to that described above as a correction signal to an electromechanical adjusting element which operates to correct the relative position of a scanning unit or scanning plate with respect to a follower in correspondence to a desired error correction course.

Of course, it should be understood that corresponding correction signals can also be obtained from correction tracks which record correction information data by means of inductive or capacitive recording means.

Furthermore, it is also possible to obtain error correction signals from mechanical correction tracks in the form of error correction profiles. For example, electromechanical elements in the form of piezoelectric elements or magnetostrictive elements or mechanical sensors which act on elements (such as potentiometers) can be used to scan such profiles. The output signals generated by these elements can be conducted in a manner similar to that described above and amplified to drive adjusting elements situated between a scanning unit or a scanning plate and a follower.

Regardless of the manner in which the correction signals are obtained, they can be stored in any desired manner (for example in an analog or a digital memory) of the measuring system. In this way, an error correction table can be generated for later use. Furthermore, the error correction information can be obtained, for example, by means of a laser interferometer used to calibrate the position measuring system as installed on a processing machine.

Figure 7:
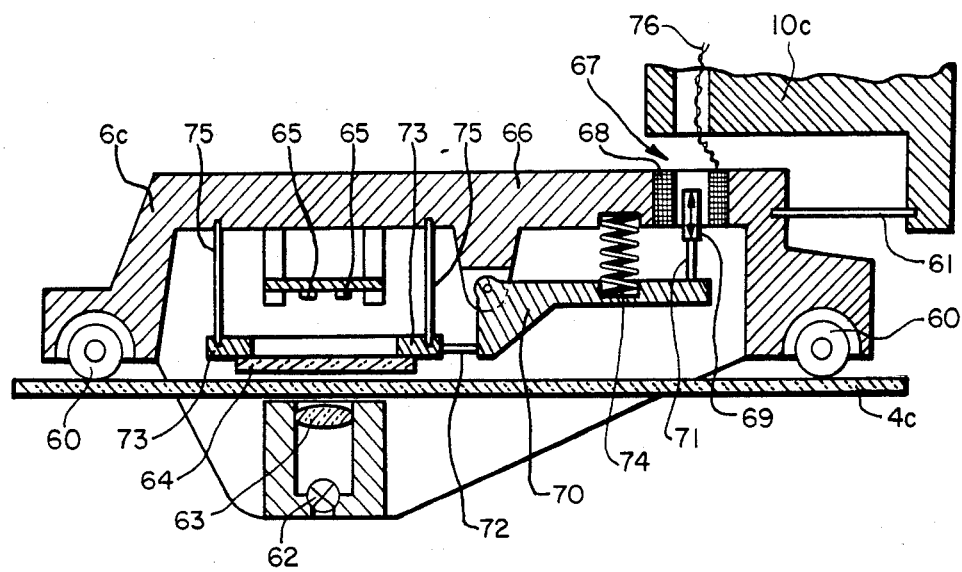
FIG. 7 is a schematic representation of portions of a length measuring system which incorporate a fourth preferred embodiment of the present invention.

FIG. 7 shows a schematic representation of a scanning unit 6c which incorporates yet another preferred embodiment of this invention. This scanning unit 6c is guided on a scale 4c by means of rollers 60. The scanning unit 6c is connected with a follower 10c in an articulated manner by means of a wire 61 which is rigid in the measuring direction. The scanning unit 6c scans the scale 4c with the aid of a lamp 62, a condensor 63, a scanning plate 64 and a plurality of photosensors 65 in a known manner. The scanning unit 6c is provided with an electromagnetic element 67 which operates to correct for errors. This electromagnetic element 67 includes an electric coil 68 which is fastened to a wall 66 of the scanning unit 6c as well as a core 69 which is longitudinally slideable in the interior of the coil 68. This core 69 acts by means of a transfer element or angle lever 70 mounted to the scanning unit 6c as a reducing element and by means of two wires 71, 72 on a carrier 73. This carrier 73 serves to support the scanning plate 64. A spring 74 is positioned between the angle lever 70 and the surface 66 to bias the angle lever for rotation in a selected direction. Movement of the carrier 73 is guided by means of two leaf springs 75 which act as a parallel guide to maintain the carrier 73 and therefore the scanning plate 64 parallel to the scale 4c. Electric conductors 76 are connected to the coil 68 and pass through the hollow interior of the follower 10c. Correction signals are applied via these conductors 76 to bring about corresponding position changes of the core 69 with respect to the coil 68. In this way, the relative position of the scanning plate 64 with respect to the scanning unit wall 66 is corrected as desired in the measuring direction in correspondence with the desired error course. Throughout the range of correction, the scanning plate 64 remains parallel to the scale 4c.

Figure 8:
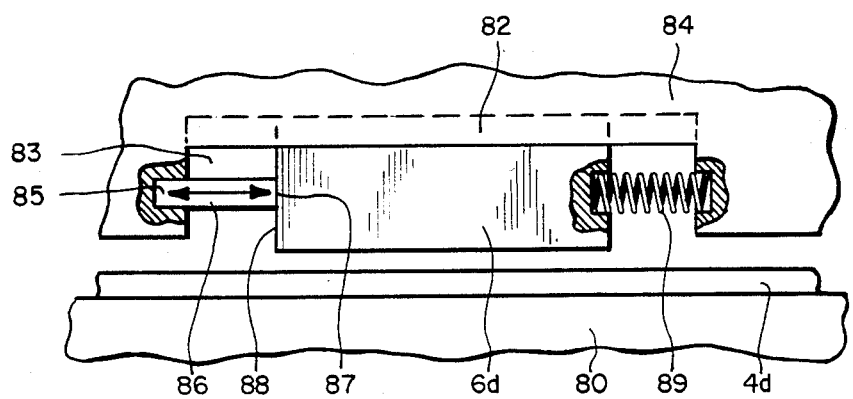
FIG. 8 is a schematic representation of portions of a length measuring system which incorporate a fifth preferred embodiment of the present invention.

FIG. 8 shows a schematic representation of a bed 80 of a machine which has a measuring scale 4d fastened thereto. This scale 4d is scanned by a scanning unit 6d in the manner described above. The scanning unit 6d is arranged to slide in a swallowtail guide 82 formed in a recess 83 of a slidepiece 84. The scanning unit 6d defines a depression 85 in which is fastened a piezoelectric element 86 which includes a surface 87 in constant contact with a surface 88 of the scanning unit 6d. A spring 89 is provided to bias the scanning unit 6d against the piezoelectric element 86. Correction signals for the correction of the relative position of the scanning unit 6d with respect to the slidepiece 84 according to the desired error course are applied to the piezoelectric element 86 by means of electrical conductors (not shown).

Figure 9:
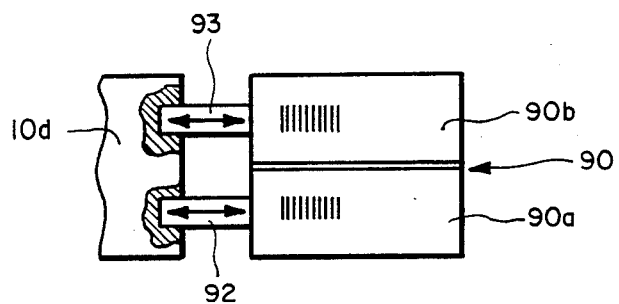
FIG. 9 is a fragmentary view of a portion of a length measuring instrument having a two-part scanning element which incorporates a sixth preferred embodiment of the present invention.

FIG. 9 shows yet another embodiment of this invention in which a scanning unit 90 includes two scanning plates 90a, 90b. Each of the scanning units 90a, 90b is acted upon by a respective piezoelectric element 92, 93 secured to a follower 10d. Conductors (not shown) are provided to apply correction signals to the piezoelectric elements 92, 93 in order to correct the relative position between the follower 10d and the scanning plates 90a, 90b according to a desired error correction course. The scanning plates 90a, 90b have, in a manner not shown, scanning fields which are offset by a phase angle of 90° in the measuring direction. This offset is provided to allow the direction of measuring movement to be determined. In order to set the desired 90° phase angle precisely, the scanning units 90a, 90b are shifted relatively to one another by means of the piezoelectric elements 92, 93.

By way of example only, and not by way of limitation, piezoelectric elements distributed by Physik Instrumente GmbH, Munich, West Germany as Part No. P 170-173 can be used for elements 15, 86, 92, 93; and electromagnetic elements distributed by Kuhnke GmbH, Malente, West Germany as Part No. Typ MM-05 can be used for elements 40,67.

In alternate embodiments, instead of an electromechanical adjusting element between the scanning unit or the scanning element and the follower or the object, there can also be provided an electric adjusting element for the correction of the relative position by means of an electromagnetic field in accordance with correction signals which can be generated as described above.

Of course, it should be understood that a wide range of changes and modifications to the preferred embodiments described above will be apparent to those skilled in the art. For example, the present invention is not limited to use in photoelectric measuring systems, but can readily be adapted for use in optical, magnetic, inductive, or capacitive measuring systems. It is therefore intended that the foregoing detailed description be regarded as illustrative rather than limiting, and that it be understood that it is the following claims, including all equivalents, which are intended to define the scope of this invention.

I claim:

1. In a digital position measuring system for measuring the relative position of two objects, of the type comprising a measuring scale secured to the first object, a scanning unit, and means for coupling the scanning unit to move with the second object to scan the scale, the improvement comprising:
   means for generating an electric correction signal which varies in accordance with a desired error correction course; and
   electrically responsive means, included in the coupling means, for varying the separation between at least a portion of the scanning unit and the second object in accordance with the electric correction signal in order to correct the relative position of the at least a portion of the scanning unit with respect to the second object.

2. The invention of claim 1 wherein the coupling means comprises a follower mounted to the second object and the separation varying means operates to vary the separation between the follower and the at least a portion of the scanning unit.

3. The invention of claim 1 wherein the scanning unit comprises a scanning plate and means for movably mounting the scanning plate to a member included in the scanning unit, and wherein the separation varying means operates to move the scanning plate with respect to the scanning unit member.

4. The invention of claim 1 wherein the separation varying means comprises a piezoelectric element mounted such that dimensional variations in the piezoelectric element vary the separation between the at least a portion of the scanning unit and the second object.

5. The invention of claim 1 wherein the separation varying means comprises a magnetostrictive element mounted such that dimensional variations in the magnetostrictive element vary the separation between the at least a portion of the scanning unit and the second object.

6. The invention of claim 1 wherein the separation varying means comprises an electromagmetic assembly comprising an electric coil and a core longitudinally slideable in the coil, wherein the coil and core are mounted such that longitudinal movement of the core varies the separation between the at least a portion of the scanning unit and the second object.

7. The invention of claim 1 wherein the separation varying means comprises an electric motor.

8. The invention of claim 1 wherein the scanning unit comprises first and second scanning plates, wherein the separation varying means operates to vary the separation between the first scanning plate and the second object, and wherein the invention further comprises electrically responsive means for varying the separation between the second scanning plate and the second object.

9. The invention of claim 1 wherein the separation varying means comprises:
   an electrically responsible adjustment element; and
   a transfer element mount to move in response to the adjustment element in order to direct and to scale movement of the adjusting element.

10. The invention of claim 1 wherein the generating means comprises:
    at least one correction track on the scale; and
    means for scanning the at least one correction track to generate the electric correction signal.

11. The invention of claim 10 wherein error correction information is optically encoded on the at-least one correction track.

12. The invention of claim 10 wherein error correction information is magnetically encoded on the at least one correction track.

13. The invention of claim 10 wherein error correction information is inductively encoded on the at least one correction track.

14. The invention of claim 10 wherein error correction information is capacitively encoded on the at least one correction track.

15. The invention of claim 10 wherein error correction information is mechanically encoded on the at least one correction track.

16. In a digital position measuring system for measuring the relative position of two objects, of the type comprising a measuring scale secured to the first object, a scanning unit, and a follower coupled to move with the second object, the improvement comprising:
    means for generating an electric correction signal which varies in accordance with a desired error correction course indicative of measuring errors resulting from at least one of errors produced by irregularities in the measuring scale and errors produced by an external guidance system for the two objects; and
    a piezoelectric element mounted between the follower and an element included in the scanning unit and responsive to the electric correction signal such that dimensional variations of the piezoelectric element produced by the electric correction signal alter the separation between the scanning unit element and the follower in order to bring about a desired error correction.

17. In a digital position measuring system for measuring the relative position of two objects, of the type comprising a measuring scale secured to the first object, a scanning unit, and a follower coupled to move with the second object, the improvement comprising:

means for generating an electric correction signal which varies in accordance with a desired error correction course indicative of measuring errors resulting from at least one of errors produced by irregularities in the measuring scale and errors produced by an external guidance system for the two objects; and a magnetostrictive element mounted between the follower and an element included in the scanning unit and responsive to the electric correction signal such that dimensional variations of the magnetostrictive element produced by the electric correction signal alter the separation between the scanning unit element and the follower in order to bring about a desired error correction.

18. The invention of claim 1 wherein the desired error correction course is predetermined as a function of measured errors resulting from at least one of errors associated with irregularities in the measuring scale and errors produced by an external guidance system for the two objects.

19. The invention of claim 1 wherein the desired error correction course is predetermined as a function of calibrated measuring errors measured with the measuring scale secured to the first object and the scanning unit coupled to move with the second object.

* * * * *

UNITED STATES PATENT AND TRADEMARK OFFICE
CERTIFICATE OF CORRECTION

PATENT NO. : 4,512,082
DATED : April 23, 1985
INVENTOR(S) : Horst Burkhardt

It is certified that error appears in the above-identified patent and that said Letters Patent is hereby corrected as shown below:

In claim 9 (column 8, line 21), please delete "mount" and substitute therefor --mounted--.

Signed and Sealed this

Seventeenth Day of May, 1988

Attest:

DONALD J. QUIGG

Attesting Officer      Commissioner of Patents and Trademarks